United States Patent
Klopfer et al.

(10) Patent No.: US 6,684,997 B2
(45) Date of Patent: Feb. 3, 2004

(54) SELF-ADJUSTING CLUTCH RELEASE BEARING

(75) Inventors: Bernhard Klopfer, Bad Windsheim (DE); Steffen Dittmer, Herzogenaurach (DE); Ludwig Winkelmann, Erlangen (DE)

(73) Assignee: INA-Schaeffler KG, Herzogenaurach (DE)

( * ) Notice: Subject to any disclaimer, the term of this patent is extended or adjusted under 35 U.S.C. 154(b) by 0 days.

(21) Appl. No.: 10/101,637

(22) Filed: Mar. 20, 2002

(65) Prior Publication Data

US 2002/0134640 A1 Sep. 26, 2002

(30) Foreign Application Priority Data

Mar. 24, 2001 (DE) .......................... 101 14 845

(51) Int. Cl.$^7$ .............................................. F16D 23/14
(52) U.S. Cl. ...................................... 192/98; 192/110 B
(58) Field of Search ............................ 192/98, 110 B; 384/612

(56) References Cited

U.S. PATENT DOCUMENTS

| | | | |
|---|---|---|---|
| 3,741,361 A | | 6/1973 | Brandenstein |
| 3,931,875 A | * | 1/1976 | Ladin ........................ 192/98 |
| 3,948,371 A | * | 4/1976 | Lonne ........................ 192/98 |
| 4,033,440 A | * | 7/1977 | Ladin ........................ 192/98 |
| 4,305,492 A | * | 12/1981 | Mori et al. ................. 192/98 |
| 4,565,272 A | | 1/1986 | Miyahara |
| 4,739,867 A | * | 4/1988 | Harrington ................. 192/98 |
| 4,815,867 A | * | 3/1989 | Ladin ........................ 384/617 |
| 5,113,988 A | * | 5/1992 | Caron ........................ 192/98 |
| 5,842,550 A | * | 12/1998 | Asada et al. .............. 192/89.24 |
| 6,464,060 B1 | * | 10/2002 | Ponson et al. ............ 192/98 |

FOREIGN PATENT DOCUMENTS

| | | |
|---|---|---|
| DE | 72 45 141 | 3/1973 |
| DE | 199 12 432 A1 | 9/1999 |
| DE | 199 49 909 A1 | 4/2001 |
| GB | 474112 | 10/1937 |

* cited by examiner

*Primary Examiner*—Saul Rodriquez
(74) *Attorney, Agent, or Firm*—Henry M. Feiereisen

(57) ABSTRACT

A release bearing includes a rolling-contact bearing having a non-rotatable inner ring, a rotating outer ring, and plural rolling members located between the inner and outer rings, An adjustment ring having a ring flange is provided for abutment against a disk spring of a clutch mechanism, and a sliding element made of bearing material is disposed in a support zone defined between complementary calotte-shaped portions of the outer ring and the adjustment ring so that the adjustment ring and the outer ring are movable relative to one another for effecting a self-adjustment of the release bearing.

22 Claims, 5 Drawing Sheets

SELF-ADJUSTING CLUTCH RELEASE BEARING

CROSS-REFERENCES TO RELATED APPLICATIONS

This application claims the priority of German Patent Application Serial No. 101 14 845.3, filed Mar. 24, 2001.

BACKGROUND OF THE INVENTION

The present invention relates, in general, to a clutch release bearing, and more particularly to a clutch release bearing for use in a clutch mechanism for motor vehicles.

A clutch release bearing is typically intended for actuation of a clutch mechanism, e.g. separating clutch, disposed between the internal combustion engine and a gearbox, and is configured as a tapered roller bearing which includes a revolving outer bearing ring, a non-rotatable inner bearing ring, and rolling members, received in a cage and guided between the bearing rings. Supported against the outer ring is an adjustment ring, which establishes a connection between a disk spring of the clutch mechanism and the release bearing, whereby the disk spring bears directly on a skirt of the outer ring at the side of the adjustment ring confronting the clutch mechanism. The adjustment ring is configured to allow a relative movement of the adjustment ring and the outer ring so as to implement a self-adjusting or self-aligning release bearing.

Such a release bearing is able to compensate shocks generated by axial misalignment with the disk spring that is connected directly to the clutch mechanism. The axial shocks, caused by the disk spring and reinforced by the operation of the internal combustion engine, increase wear and thus reduce the service life of the release bearing.

German Pat. No. 199 12 432 A1 describes a release bearing with a revolving outer ring for direct support of an adjustment ring. In their contact zone, the outer ring and the adjustment ring have complementary calotte-shaped segments to allow a relative movement. The outer ring of the release bearing as well as the adjustment ring are made of steel. As a consequence, rust formation caused by friction can be experienced, resulting in greater wear. High wear results in annoying noise and triggers the so-called clutch judder that adversely affects the overall riding comfort, so that the service life of these release bearings is insufficient to meet the demands by vehicle manufactures.

It would therefore be desirable and advantageous to provide an improved release bearing, which obviates prior art shortcomings and which exhibits a long service life, is maintenance-free and inhibits noise while still being reliable in operation and cost-efficient to produce.

SUMMARY OF THE INVENTION

According to one aspect of the present invention, a release bearing includes a rolling-contact bearing having a non-rotatable inner ring, a rotating outer ring, and plural rolling members located between the inner and outer rings; an adjustment ring having a ring flange for abutment against a disk spring of a clutch mechanism; and a sliding element made of bearing material and disposed in a support zone, which is defined between complementary calotte-shaped portions of the outer ring and the adjustment ring so that the adjustment ring and the outer ring are movable relative to one another for effecting a self-adjustment of the release bearing.

The present invention resolves prior art problems by providing a sliding element in the support zone or contact zone between the adjustment ring and the revolving outer ring of the release bearing. The sliding element is suitably made of a bearing material or appropriate friction-reducing and wear-resistant material which is maintenance-free to ensure a long service life. As a result of the reduction in friction, the self-adjusting feature of the components, outer ring and adjustment ring, is significantly improved. The optimized self-adjustment is further able to significantly dampen the axial shocks transmitted via the clutch mechanism into the release bearing. The provision of a sliding element eliminates a direct contact of the steel parts, adjustment ring and outer ring, and this prevents friction-based rust formation. By sandwiching the sliding element in the support zone between the outer ring and adjustment ring, the latter components are effectively decoupled from one another so that noise development is suppressed. A direct contact of the adjustment ring upon the outer ring is suitably avoided to thereby ensure a maintenance-free, low friction and sat the same time damping self-adjustment between the mutually moving components, adjustment ring and outer ring. The sliding element can be connected to either one of the carriers, i.e. outer ring or adjustment ring, without requiring any modification of the carrier that is selected to bear against the sliding element, so that existing installation space can be used. Support of the adjustment ring on the outer ring permanently eliminates friction-based rust formation.

It is to be understood by persons skilled in the art that the term "carrier" used in the description to refer to the outer ring or to the adjustment ring of the release bearing.

Wear of the spherical or calotte-shaped portions in the support zone between the sliding element and the outer ring or adjustment ring is significantly reduced compared to conventional self-adjusting release bearings. Moreover, clutch judder is effectively prevented which has a positive effect to reduce noise development. A sliding element according to the present invention can be fabricated in great numbers and does not require special handling for installation or securement to the adjustment ring or outer ring of the release bearing.

According to one embodiment of the present invention, the sliding element may be connected to the outer ring of the release bearing. A largest possible contact surface can be realized, when the sliding element embraces the entire side of the outer ring and is extended to an area shy of the contour of the non-rotatable inner ring at formation of a slight annular gap. In this way, the rotating outer ring can be optimized with respect to size and weight and may have a width which is substantially limited to the provision of a suitable raceway for the rolling members. At the same time, the sliding element ensures on the side confronting the adjustment ring a large contact zone or enlarged support zone for the adjustment ring. Thus, a sufficiently large contact zone or support zone between the mutually movable components is realized even at extremely tilted positions. As an alternative, the sliding element may also be connected directly to the adjustment ring to form a unitary structure which has calotte-shaped portions to complement the outer contour of the rotating outer ring of the release bearing. In either case, the large-area contact of the sliding element upon the adjustment ring or outer ring results in a sufficient support in each and every position, i.e., also when the adjustment ring occupies an extremely tilted disposition. At the same time, the large-area contact of the sliding element ensures a reduced surface pressure so that the strength and rigidity of the sliding element is not adversely affected.

According to another feature of the present invention, the sliding element may also be configured in segments, instead of a continuous contact, for resting upon the outer ring or adjustment ring. In this way, the adhesion of the sliding element is improved because tension as a consequence of different coefficients of thermal expansion between the different materials of the adjustment ring or outer ring, and the sliding element is effectively eliminated. Of course, the sliding element may also be configured with a longitude slot or groove, which coincides with the symmetry axis, in order to compensate varying coefficients of thermal expansion. Instead of one slot or groove, also several slots or grooves may be provided about the circumference of the sliding element and formed alternately on the inside or outside of the sliding element or extend through the wall of the sliding element. Any suitable configuration of the slot or slots is conceivable, i.e., straight, meander-shaped or slanted.

The production costs for making a sliding element according to the present invention can be reduced, when employing an injection molding process. This process can also be used to incorporate in a single step the slots and grooves in the sliding element for compensation of varying coefficients of thermal expansion.

Regardless of its configuration, the sliding element may be positively secured to either one of the carriers, i.e. outer ring or the adjustment ring of the release bearing. Suitably, the surface of the carrier may be formed with grooves for engagement or guidance of projections of the sliding element. As a result, the sliding element is also secured against rotation with respect to the carrier. As an alternative or in addition to the positive securement, the sliding element may also be urged into forced engagement with the carrier, for example, through gluing. An example of a suitable glue includes a high-temperature adhesive. Gluing of the sliding element ensures also a compensation of even small unevenness between the carrier and the sliding element so as to prevent the formation of voids which are detrimental to a secure attachment of the sliding element.

According to another feature of the present invention, the sliding element may be formed by a coating applied directly through injection onto the outer ring or adjustment ring. In this way, diametrical tolerances of the mating components, outer ring and adjustment ring, that may influence the structural length, are eliminated. Suitably, the carrier may include in the contact zone with the sliding element a circumferential crease or groove, which is filled by the material of the sliding element during injection molding, to realize an effective positive securement of the sliding element to the carrier and to prevent a rotation. Stress through shrinkage during injection molding can be counteracted in a controlled manner, by providing the outer ring or the adjustment ring in the support zone with at least one axis-parallel or helical notch. To prevent a rotation of the parts, a groove is provided in diametric opposition to the notch at the diameter and/or in the plane surface of the adjustment ring or outer ring and can also be filled with sliding element material during injection molding.

The sliding element, on the one hand, and the outer ring or the adjustment ring, on the other hand, may be made of different materials. The material for the sliding element is selected by taking into account optimum wear properties and friction properties as well as inexpensive fabrication and mounting to the outer ring or adjustment ring. The carrier, outer ring or adjustment ring, is suitably made of steel. The configuration of the carrier allows hereby a production without material removal, in particular a deep-drawing process that enables a production of the adjustment ring as well as of the outer ring on a large scale in a cost-efficient manner. To realize sufficient strength, especially wear-resistance, the adjustment ring as well as the outer ring may be heat-treated at least in those zones that are subject to high loads, such as the calotte-shaped segments, tracks for the rolling members, as well as the contact surface for support of the disk spring of the clutch mechanism.

The sliding element may suitably be made of a high-strength and wear-resistant plastic, such as thermoplastic material or a duroplastic material. The sliding element may include additives such as carbon fibers, $MoS_2$ fractions, and/or epoxy resins, alone or in combination, for realizing a lubrication and/or improved service life, when the sliding element is based on duroplastic material. The use of duroplastic material significantly enhances the useful life of the sliding element, without adversely affecting the manufacturing costs. The sliding element may also be made of PPA or PA46 combined with carbon fibers as wear-reducing agent and PTFE as friction-reducing agent. Its may also be conceivable to make the sliding element of ceramic material. This ceramic material, also called industrial ceramic, exhibits optimal wear-resistance and is therefore suitable for use with a contact surface that is subject to severe conditions and soiling during operation of the release bearing.

Persons skilled in the art will understand, that the foregoing description of materials for the sliding element is not exhaustive but only illustrative, because other materials or material combinations may be conceivable as well so long as they generally follow the concepts outlined here, i.e. exhibit sufficient friction properties and wear-resistance and can be shaped appropriately and manufactured in a cost-efficient manner.

The adjustment ring may be made by a deep-drawing process and is suitably made of steel C80M which subsequently can be hardened through heat-treatment to realize an improved wear resistance.

According to another embodiment of the present invention that optimizes the number of used components includes an adjustment ring which is supported directly by the outer ring. Hereby, these structural parts form in a contact zone or support zone complementary calotte-shaped portions. An adjustment ring of this type can then suitably combined with a sliding element made from a duroplastic material by an injection tool drawn in axial direction to provide a N-section profile. The use of duroplastic material is advantageous here because of its sufficient strength and shape stability. The sliding element may be secured to the ring flange through gluing, in combination with protrusions of the sliding element for positive engagement in respective recesses of the ring flange.

According to another feature of the present invention, the adjustment ring may also be so configured that its components, ring flange and sliding element, are made of same material. For example, the adjustment ring may be made of ceramic material or duroplastic material. The components of the adjustment ring may be glued for realizing a permanent connection. Gluing may be assisted by a positive connection in which the sliding element is connected to the ring flange via a crown gearing and/or spline profiles or the like, whereby a greater contact surface is realized at the same time. In addition, the adjustment ring is secured against rotation and the bonding of the parts is improved. Excess glue can be accumulated in depressions or notches formed on at least one bonded surface of the mating annular regions being joined.

According to another feature of the present invention, that optimizes the number of used components includes a single-piece adjustment ring which is made exclusively of duroplastic material or ceramic and combined with the release bearing. An adjustment ring of this type corresponds also to an assembled adjustment ring, which has components made of same material.

According to another feature of the present invention, the release bearing may include a captivating mechanism by which all components of the release bearing are captivated after mounting and installation. Hereby, the rotating outer ring is provided with a sleeve or clip which extends axially over a contact zone of the adjustment ring with the outer ring. The sleeve or the clip is hereby spaced from the adjustment ring and guided while maintaining an annular gap. An end portion of the sleeve projects behind a marginal area, so that the release bearing including the adjustment ring is captivated to form a unitary structure.

According to another feature of the present invention, the calotte-shaped portions of the outer ring and the adjustment ring are disposed at an angle of $\geq 15°$ to an axis of symmetry of the release bearing. Suitably, the sliding element and the outer ring or the adjustment ring have a radius of $\geq 30$ mm in an area of the support zone.

BRIEF DESCRIPTION OF THE DRAWINGS

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
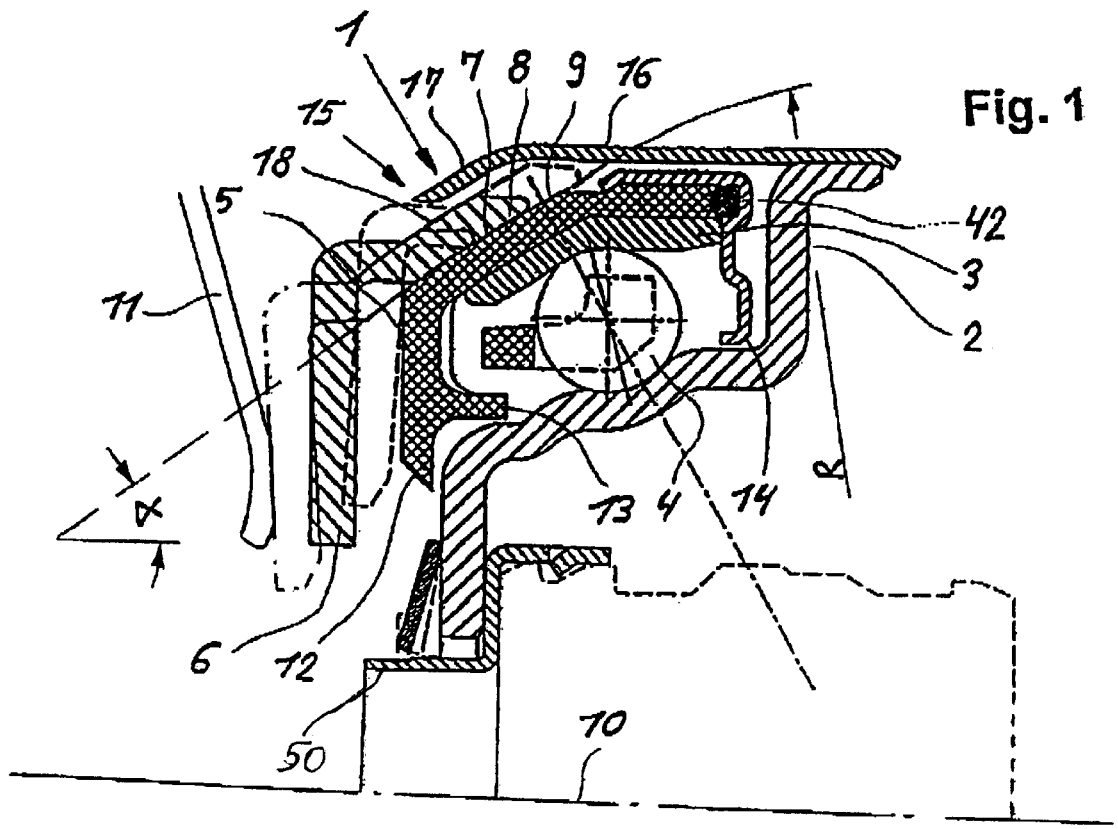
FIG. 1 is a half-section of a release bearing according to the present invention for interaction with an adjustment ring, with a sliding element embracing a rotating outer ring for support of the adjustment ring.

Throughout all the Figures, same or corresponding elements are generally indicated by same reference numerals.

Turning now to the drawing, and in particular to FIG. 1, there is shown a half-section of a release bearing, generally designated by reference numeral 1 and defined by a symmetry axis 10. The release bearing 1 is mounted on a guide sleeve 50, positioned in concentric surrounding relationship to a driveshaft, not shown, which connects an internal combustion engine to a gearbox. The release bearing 1 is configured in the form of a tapered roller bearing and includes a non-rotatable inner ring 2, a rotating outer ring 3 and a plurality of rolling members 4 positioned between the inner ring 2 and the outer ring 3. Surrounding the outer ring 3 on the outside is a sliding element 5, the outside of which supports an adjustment ring 6 to prevent a direct contact between the outer ring 3 and the adjustment ring 6 in a support zone 7. In order to enable a self-adjustment of the release bearing 1 with respect to the adjustment ring 6, the directly supporting components, the outer ring 13 and the adjustment ring 6, have complementary calotte-shaped configuration in the support zone 7. As indicated in FIG. 1, the support zone 7 extends with respect to the symmetry axis 10 of the release bearing 1 at an angle α of $\geq 15°$. Reference character R denotes the radius of the support zone 7, i.e., the sliding element 5 and the outer ring 3 have a radius R of $\geq 30$ mm in the area of the support zone 7.

The adjustment ring 6 has a substantially disk-shaped configuration and supports a disk spring 11 which is connected directly or indirectly with the clutch mechanism. FIG. 1 shows the adjustment ring 6 in a neutral position as well as in both extreme tilting positions, shown in broken and dashdot lines, respectively, and referring to positions in which the adjustment ring 6 is tilted relative to the outer ring 3.

On its side confronting the adjustment ring 6, the sliding element 5 includes a leg portion 12 which is formed with a collar 13 extending axially inwardly in the direction of the rolling members 4 to terminate shy of the inner ring 2 at formation of an annular gap. A shielding plate 14 of sheet metal is mounted form-fittingly to the leg portion distal end of the sliding element 5 and extends toward the inner ring 2 to terminate just shy thereof to define an annular gap therebetween. The collar 13 of the sliding element 5 and the shielding plate 14 seal together an interior space of the release bearing 1 on both sides of the rolling members 4. The release bearing 1 further includes a captivating mechanism, generally designated by reference numeral 15 and including a sheet metal holder or clip 16 which is securely fixed to the inner ring 2. The clip 16 has a substantially cylindrical configuration and extends axially beyond the support zone 7 between the sliding element 5 and the outer ring 3. The clip 16 has an end portion 19 which is bent inwardly to radially overlap an end portion 18 of the adjustment ring 6.

Turning now to FIGS. 2 to 8, there are shown releases bearings of substantially similar configuration as the release bearing 1 of FIG. 1 so that parts corresponding with those in FIG. 1 are denoted by identical reference numerals and not explained again. In describing the following Figures, like parts of the release bearing 1, in particular the sliding element 5, will be identified by corresponding reference numerals followed by a distinguishing lower case character.

Figure 2:
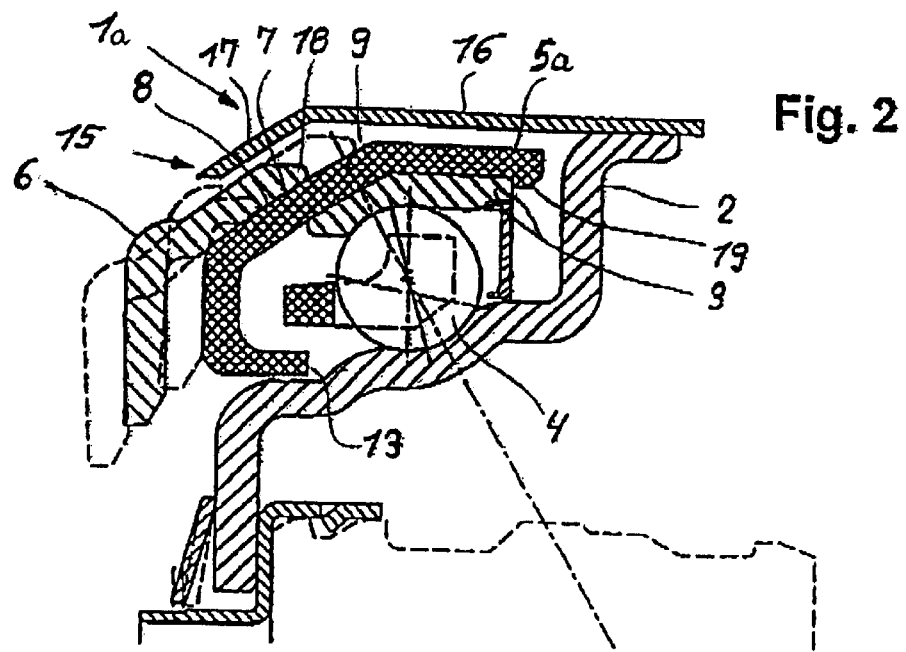
FIG. 2 is a half-section of a modified release bearing according to the present invention, showing the sliding element snapped to the outer ring.

FIG. 2 shows a release bearing 1a which differs from the release bearing 1 of FIG. 1 in that the outer ring 3a is secured form-fittingly to the sliding element 5a. Hereby, the sliding element 5a is provided on the side distal to the adjustment ring 6 with a retaining lug 19 which snaps onto an end face of the outer ring 3, when installed.

Figure 3:
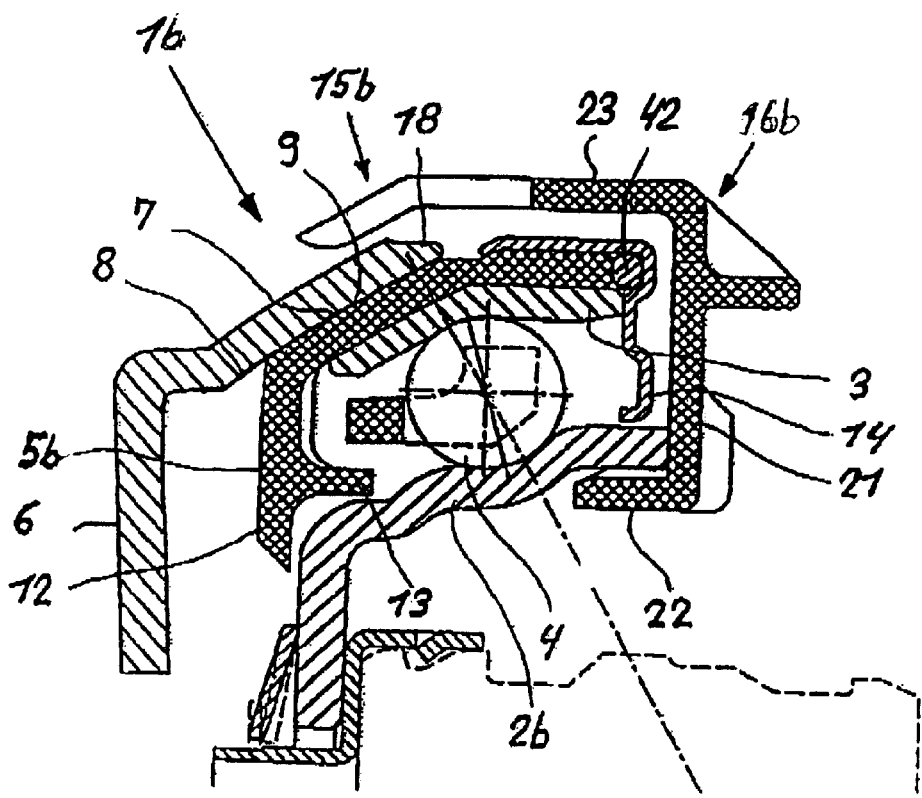
FIG. 3 is a half-section of another variation of a release bearing according to the present invention, incorporating a captivating mechanism.

The release bearing 1b according to FIG. 3 includes a sliding element 5b which, like in the embodiment of FIG. 1, is mounted by the shielding plate 14 to the outer ring 3 but includes in addition an axially compressed seal 42 for better sealing action. The captivating mechanism 15b of the release bearing 1b is implemented by providing a clip 16b which has a substantially U-shaped configuration and includes an inner leg 22 which is secured to an axially projecting portion of the inner ring 2b. Extending the inner leg 22 is a radial portion 21 which covers a confronting end face of the release bearing 1b. An outer leg 23 of the clip 16b extends axially above the support zone 7 between the adjustment ring 6 and the sliding element 5b. Hereby, an end portion of the leg 23 is bent inwardly to partially overlap the adjustment ring 6.

Figure 4:
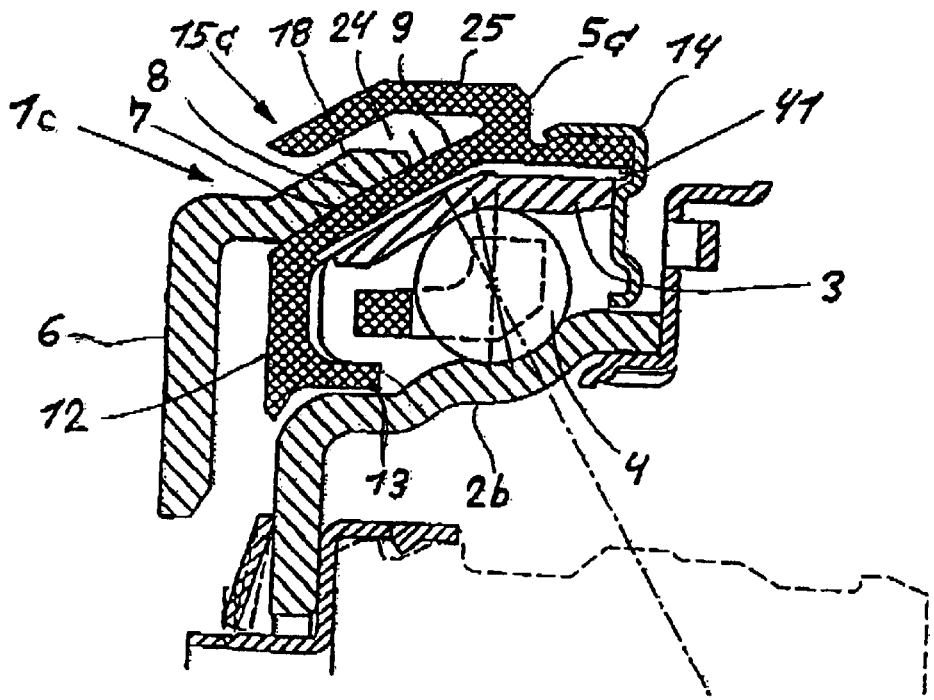
FIG. 4 is a half-section of still another variation of a release bearing according to the present invention, which used a sliding element for implementing a captivating mechanism for the adjustment ring.

The release bearing 1c according to FIG. 4 includes a sliding element 5c which is so configured as to form an outer slot 24 in substantial parallel relationship to the support zone 7 for engagement of an end portion 18 of the adjustment ring 6. A slot-bounding outer wall portion 25 of the sliding element 5c extends at a distance to the end portion 18 of the adjustment ring 6 to realize a radial overlap and thereby implement a captivating mechanism 15c. The sliding element 5c has a groove 41 which faces the outer ring 3 and is provided to compensate tension as a result of different coefficients of thermal expansion between the materials of the sealing element and the outer ring 3. In addition, the groove 41 can be used for receiving lubricant and/or wearing particles.

Figure 5:
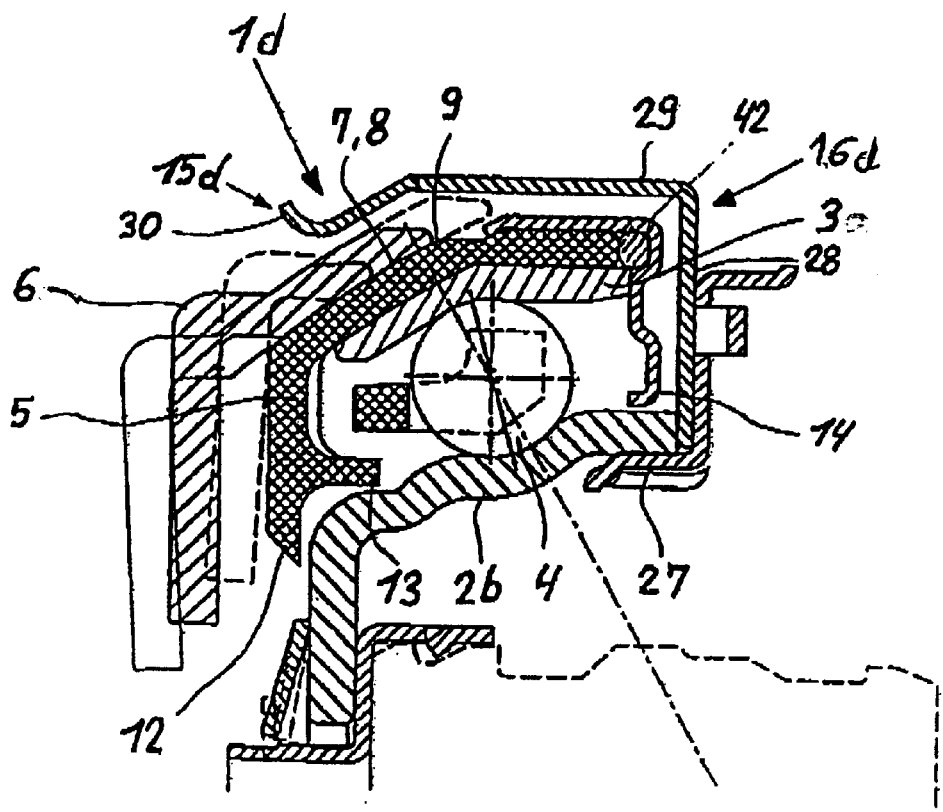
FIG. 5 is a half-section of still another variation of a release bearing according to the present invention, incorporating yet another modified captivating mechanism.

The release bearing 1d according to FIG. 5 includes a captivating mechanism 15d in the form of a clip 16d shaped from sheet metal and comparable to the clip 16b of FIG. 3. The clip 16d includes an inner substantially Z-shaped retaining member 27, which is secured to the inner ring 2b, and an angle 28, which connects to the retaining member 27 and screens with a radial portion an end face of the release bearing 1d. The angle 28 terminates in an outer cylindrical leg 29 which extends axially above the support zone 7 between the adjustment ring 6 and the outer ring 3. The leg 29 has an end portion 30 which is bent inwardly and terminates in an outwardly arched end to permit a desired radial deflection during installation of the adjustment ring 6 and thus to simplify the assembly.

Figure 6:
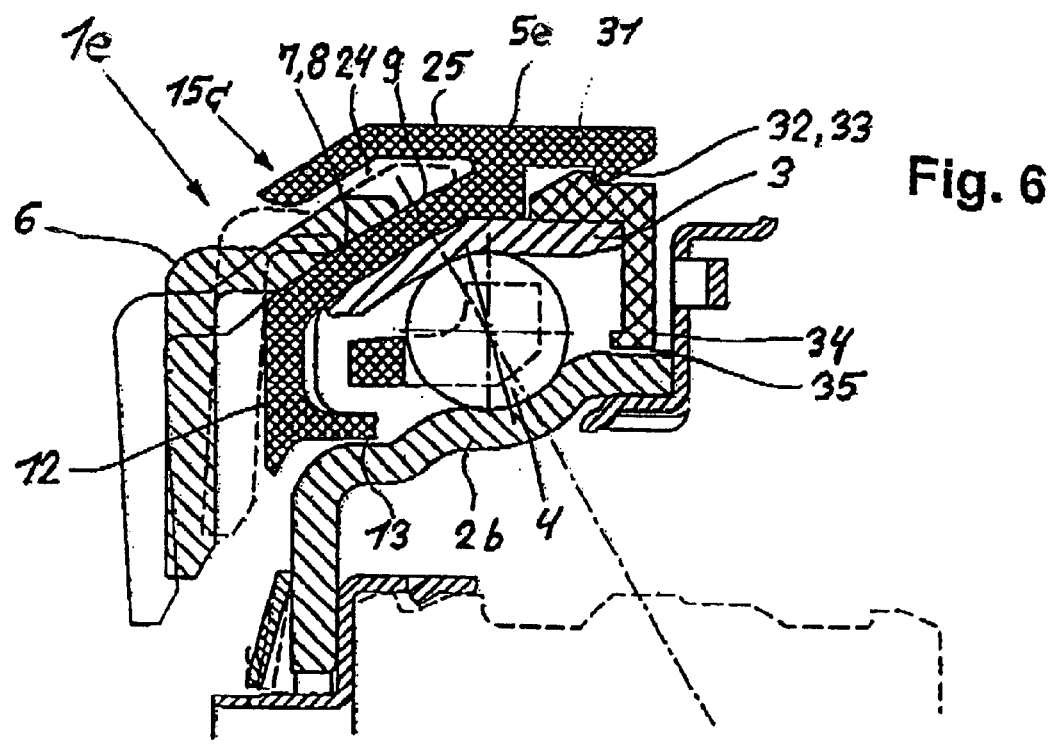
FIG. 6 is a half-section of still another variation of a release bearing according to the present invention.

The release bearing 1e according to FIG. 6 includes a sealing element 5d, which corresponds substantially to the configuration shown in FIG. 4, and includes slot 24 for realizing the captivating mechanism 15c. In addition, the sliding element 5e is provided on its side distal to the slot 24 with an axial prolongation 31 which terminates with a circumferential or segmental retention nose 32 in radially inward direction. When installed, the retention nose 32 latches on to a shoulder 33 of a disk-like sealing element 34 which has an angled configuration. The sealing element 34 surrounds, axially limited, the outside of the outer ring 3 and extends in radial direction towards the inner ring 2b at formation of an annular gap 35.

Figure 7:
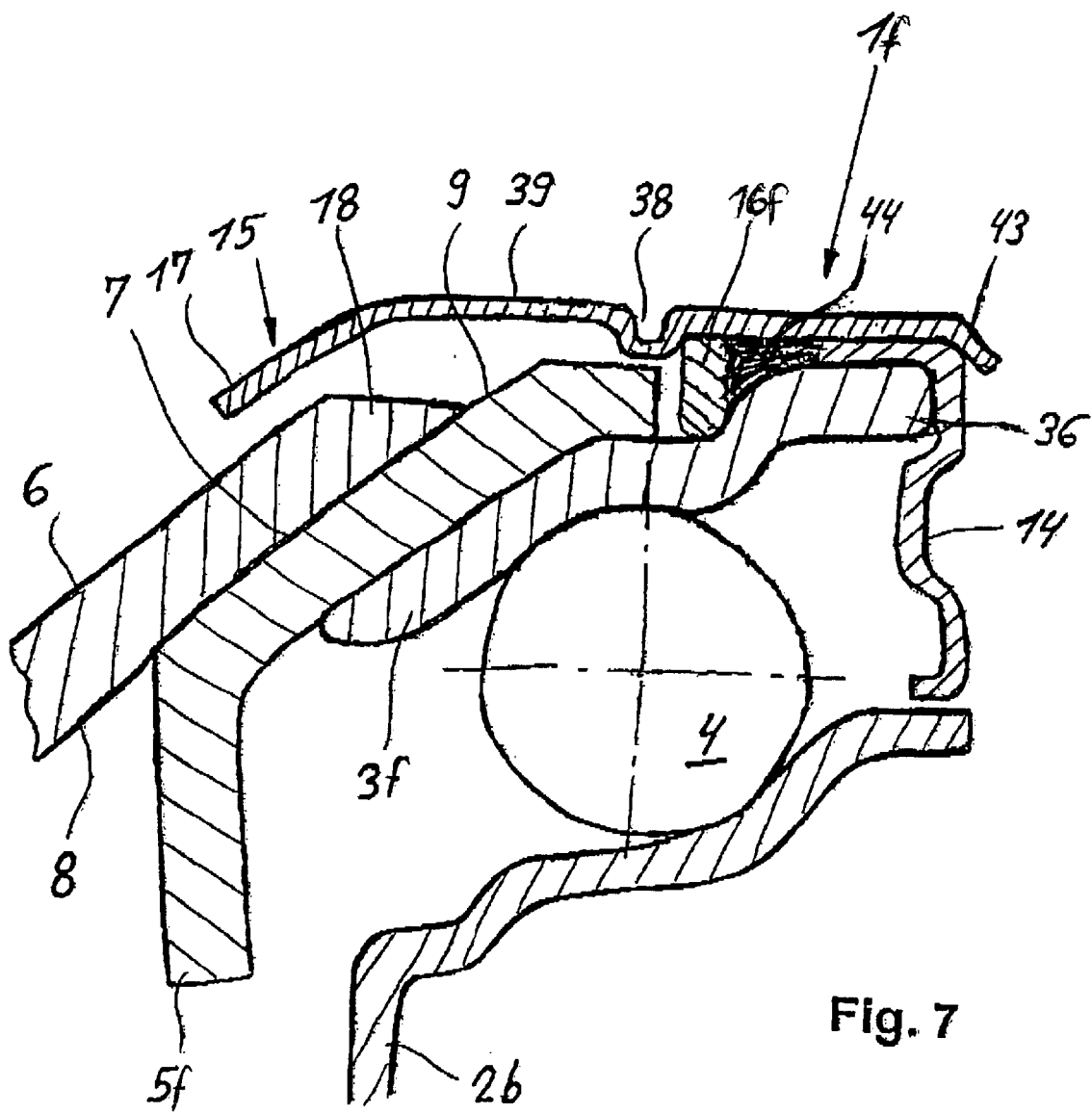
FIG. 7 is a sectional view of a release bearing according to the present invention, in which the outer ring has secured thereto the sliding element and a captivating mechanism.

The release bearing 1f according to FIG. 7 includes an outer ring 3f and a sliding element 5f, whereby the outer ring 3f is formed on its end distal to the sliding element 5f with a radially outwardly directed step 36 for support of a ring-shaped clip 16f which is surrounded on the outside by a sheet metal sleeve 39. The sleeve 39 embraces the outside of the release bearing 1f to form on one end the captivating mechanism 15f by means of an inwardly bent end portion 17. On the other end 43, the sleeve 39 secures form-fittingly the shielding plate 14 which is disposed on the outer ring 3f to provide a sealing action of the interior space of the release bearing 1f for the rolling members 4 and extends radially toward the inner ring 2b. The sleeve 39 is formed with a circumferential depression 39 for securing the sleeve 39 to the clip 16f. Once the assembly is completed, the end 43 of the sleeve 39 is bent inwardly to unite all components of the release bearing 1f to form a captivated unitary structure. A sealing mass 44 may be incorporated in an axial ring space bounded by the shielding plate 14 and the clip 16f for realizing an improved sealing o the sleeve 39 and the outer ring 3b. A suitable material for the sealing mass 44 may be silicone or acryl.

Figure 8:
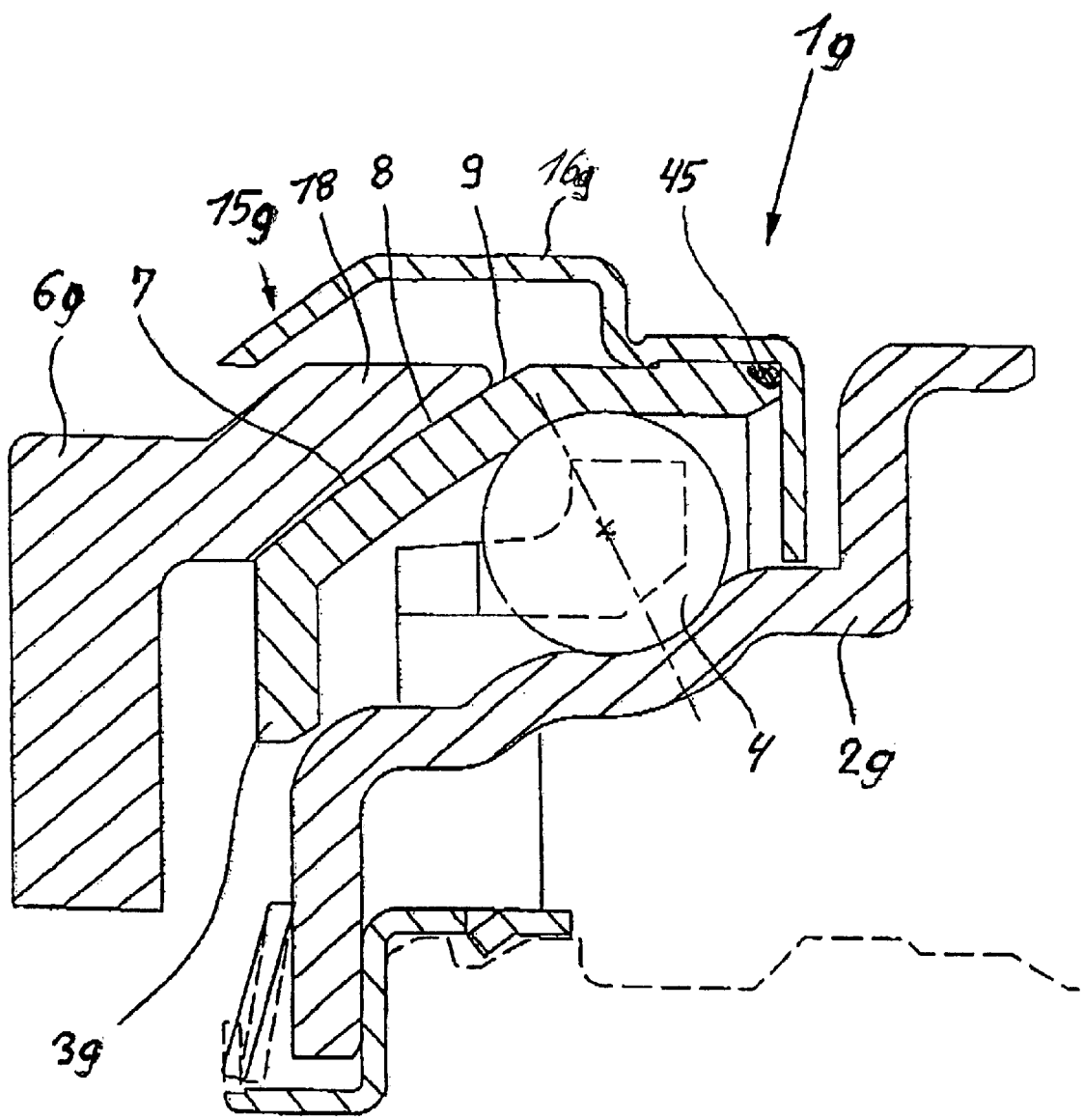
FIG. 8 is a sectional view of another variation of a release bearing according to the present invention, in which the adjustment ring includes a sliding element.

The release bearing 1g according to FIG. 8 includes a single-piece adjustment ring 6g which is supported by the outer ring 3g in the support zone 7 in form-fitting manner. The component-optimized release bearing 1g includes a clip 16g designed as a multi-function component which assumes the function of a shielding plate and a seal between the outer ring 3g and the inner ring 2g, on the one hand, and provides a captivating mechanism 15g by having an outer leg which extends in axial direction up to an area above the support zone 7 and has one end to radially overlap an end portion 18 of the adjustment ring 6b.

Regardless of its configuration, the sliding element may be formed by a coating applied directly through injection onto the outer ring. In this way, diametrical tolerances of the mating components, outer ring and adjustment ring, that may influence the structural length, are eliminated.

While the invention has been illustrated and described as embodied in a self-adjusting clutch release bearing, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A release bearing, comprising:
   a rolling-contact bearing having a non-rotatable inner ring, a rotating outer ring, and plural rolling members located between the inner and outer rings;
   an adjustment ring having a ring flange for abutment against a disk spring of a clutch mechanism; and
   a sliding element made of bearing material and disposed in a support zone, which is defined between complementary calotte-shaped portions of the outer ring and the adjustment ring so that the adjustment ring and the outer ring are movable relative to one another for effecting a self-adjustment of the release bearing,
   wherein the adjustment ring and the outer ring are made as a deep-drawn part of steel and combined with the sliding element to a unitary structure, wherein the sliding element is made of a wear-resistant and high-temperature-resistant plastic.

2. A release bearing comprising:
   a rolling-contact bearing having a non-rotatable inner ring, a rotating outer ring, and plural rolling members located between the inner and outer rings;
   an adjustment ring having a ring flange for abutment against a disk spring of a clutch mechanism; and
   a sliding element made of bearing material and disposed in a support zone, which is defined between complementary calotte-shaped portions of the outer ring and the adjustment ring so that the adjustment ring and the outer ring are movable relative to one another for effecting a self-adjustment of the release bearing,
   wherein the sliding element is operatively connected to the outer ring.

3. The release bearing of claim 2, wherein the sliding element has segmental areas resting in the support zone upon the outer ring.

4. The release bearing of claim 2 wherein the sliding element has an inner surface and an outer surface and is formed with circumferentially spaced grooves about at least one of the inner surface and the outer surface.

5. The release bearing of claim 2, wherein the sliding element is made through an injection molding process.

6. The release bearing of claim 2, wherein the sliding element is positively connected to the outer ring.

7. The release bearing of claim 2, wherein the sliding element is a coating injection-molded onto the outer ring.

8. The release bearing of claim 2, wherein the sliding element, on the one hand, and the outer ring or the adjustment ring, on the other hand, are made of different material.

9. The release bearing of claim 2, wherein the adjustment ring and the outer ring are made as a deep-drawn part of steel and combined with the sliding element to a unitary structure, wherein the sliding element is made of a wear-resistant and high-temperature-resistant plastic.

10. The release bearing of claim 9, wherein the sliding element is made of thermoplastic material or duroplastic material.

11. The release bearing of claim 8, wherein the sliding element includes at least one additive selected from the group consisting of carbon fibers, $MoS_2$, and epoxy resins, for realizing an integrated lubrication and/or improved service life in combination with duroplastic material.

12. The release bearing of claim 10, wherein the sliding element is made of PPA or PA46, combined with carbon fibers as wear-reducing agent and PTFE as friction-reducing agent.

13. The release bearing of claim 8, wherein the sliding element is made of ceramic material.

14. The release bearing of claim 2, wherein the calotte-shaped portions of the outer ring and the adjustment ring are disposed at an angle of $\geqq 15°$ to an axis of symmetry of the release bearing.

15. The release bearing of claim 2, wherein the adjustment ring includes a radial flange of steel for interaction with the disk spring and configured for direct attachment of the sliding element of plastic or ceramic.

16. The release bearing of claim 2, wherein the sliding element and the outer ring or the adjustment ring have a radius of $\geqq 30$ mm in an area of the support zone.

17. The release bearing of claim 2, and further comprising a holding element secured to one of the inner ring and outer ring and overlapping an end portion of the adjustment ring with play to thereby captivate the release bearing and the adjustment ring to form a unitary structure.

18. The release bearing of claim 17, wherein the holding element is a clip having a retaining member, which is secured to the inner ring, and an angle, which connects to the retaining member, said angle having a radial portion to screen an end face of the release bearing and an axial portion extending at a distance to the support zone between the adjustment ring and the outer ring.

19. The release bearing of claim 18, wherein the retaining member has a substantially Z-shaped configuration.

20. The release bearing of claim 18, wherein the axial portion terminates in an end portion which is bent inwardly and terminates in an outwardly arched end to permit a radial deflection during installation of the adjustment ring.

21. The release bearing of claim 18, wherein the clip is made of sheet metal.

22. A release bearing, comprising:

a rolling-contact bearing having a non-rotatable inner ring, a rotating outer ring, and plural rolling members located between the inner and outer rings;

an adjustment ring having a ring flange for abutment against a disk spring of a clutch mechanism; and a sliding element made of bearing material and disposed in a support zone, which is defined between complementary calotte-shaped portions of the outer ring and the adjustment ring so that the adjustment ring and the outer ring are movable relative to one another for effecting a self-adjustment of the release bearing, wherein the adjustment ring includes a radial flange of steel for interaction with the disk spring and configured for direct attachment of the sliding element of plastic or ceramic.

* * * * *